J. F. BRADSHAW.
PUNCH.
APPLICATION FILED AUG. 9, 1911.

1,033,527.

Patented July 23, 1912.

2 SHEETS—SHEET 1.

Witnesses

Inventor
J. F. Bradshaw
By Chas E Brock
Attorney

J. F. BRADSHAW.
PUNCH.
APPLICATION FILED AUG. 9, 1911.
1,033,527.
Patented July 23, 1912.
2 SHEETS—SHEET 2.
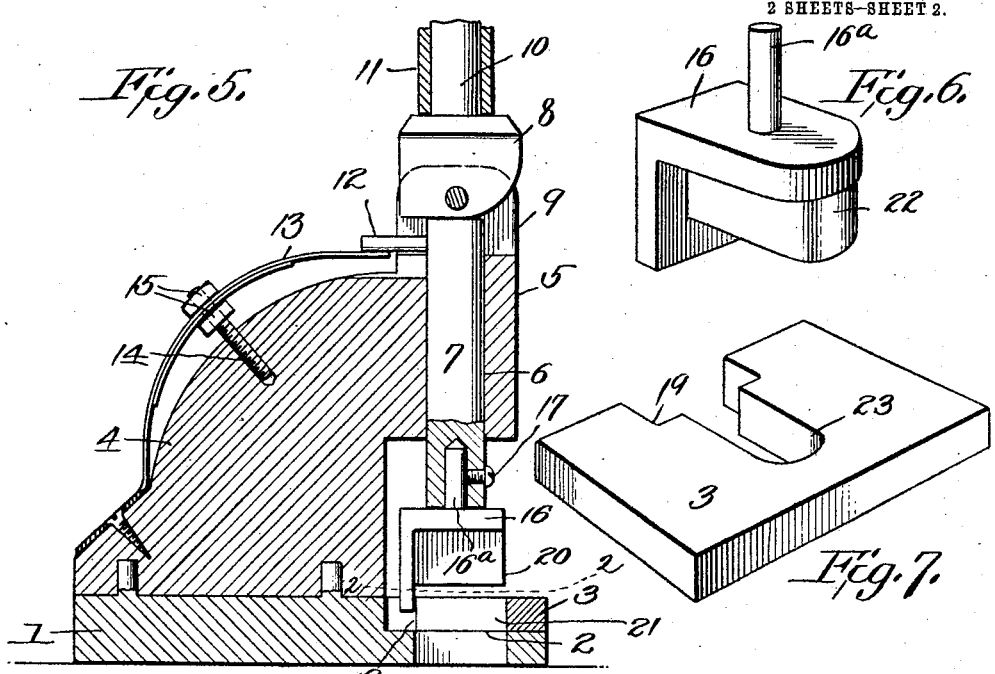
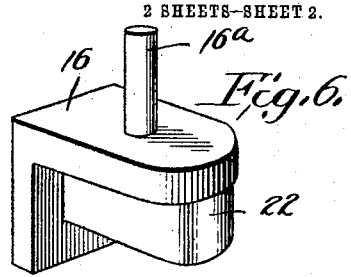
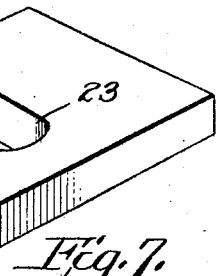
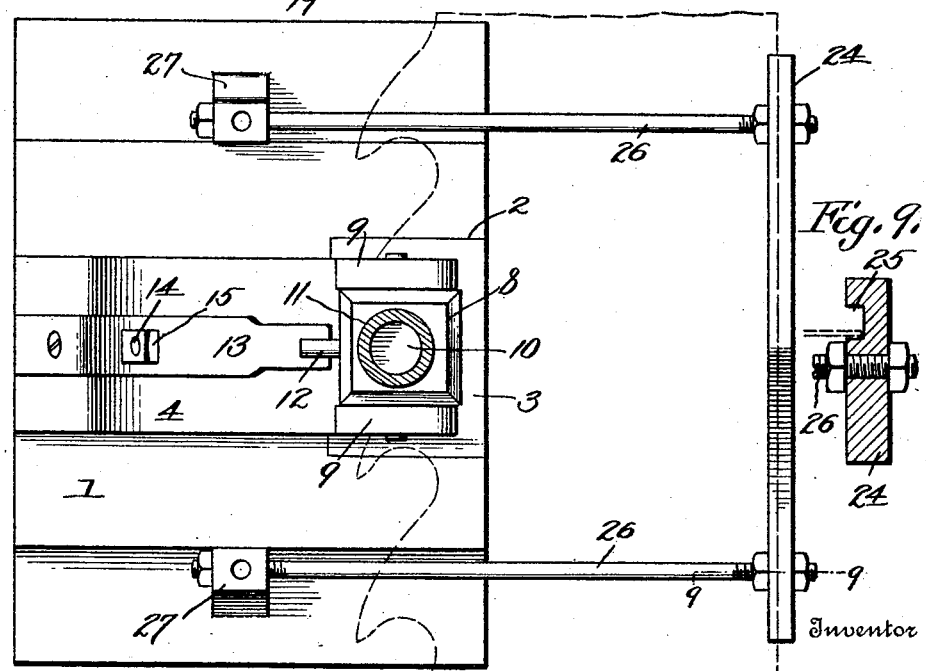

UNITED STATES PATENT OFFICE.

JOSEPH FORT BRADSHAW, OF MORTIMER, NORTH CAROLINA.

PUNCH.

1,033,527.　　　　Specification of Letters Patent.　　Patented July 23, 1912.

Application filed August 9, 1911. Serial No. 643,124.

*To all whom it may concern:*

Be it known that I, JOSEPH F. BRADSHAW, a citizen of the United States, residing at Mortimer, in the county of Caldwell and State of North Carolina, have invented a new and useful Improvement in Punches, of which the following is a specification.

This invention relates to a device for punching out saw teeth, and is designed to be used upon both cross cut and band saws.

It is a common practice at present to discard saws after the teeth have become worn down to such an extent that the saw is of no further practical use. It has been proposed to lengthen the teeth by filing, but owing to the hardness of the metal to be operated upon this is impracticable in connection with saws of any length, and can be employed to advantage, only in connection with light and small hand saws. Small emery wheels have also been used in retoothing worn saws but the wheels are soon destroyed, and furthermore a heating of the saw teeth due to the use of such a wheel destroys the temper of the saw, thus practically rendering it useless even after the teeth have been brought to the proper length.

The only practical and economical way of treating a worn saw is to shear off the teeth so as to leave a smooth blade and this is especially necessary in operating upon saws from which a portion of the teeth have been broken by coming into engagement with a spike or nail in a log. The teeth having been sheared off, an entirely new set of teeth can be punched out, thus converting the old saw into practically a new saw, but of less width.

The object of this invention therefore is to provide a device by means of which hand labor may be employed for the purpose of punching out new teeth after the shearing process has been completed.

Figure 1:
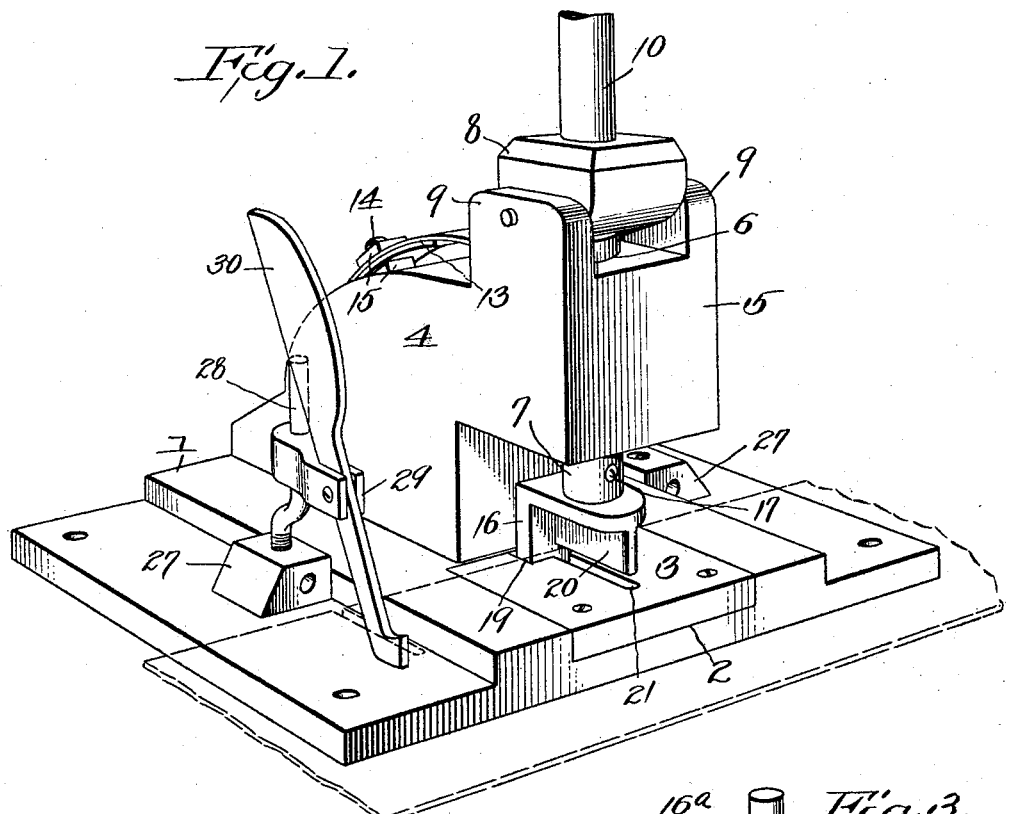
Figure 2:
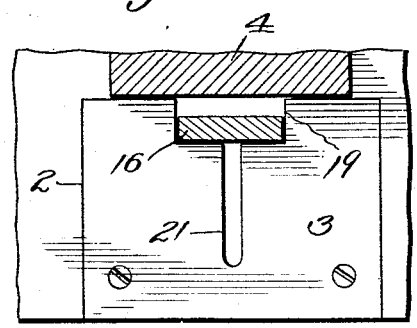
Figure 3:
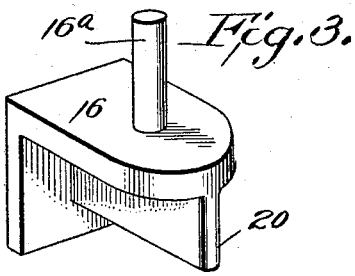
Figure 4:
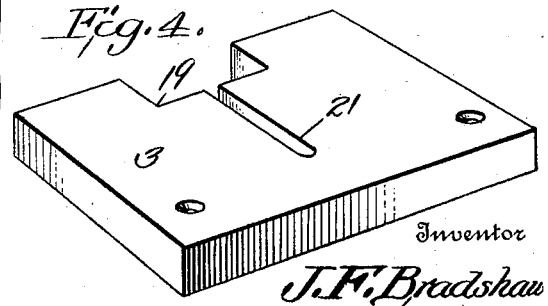

With this object in view, the invention consists of the novel features of construction hereinafter fully described, pointed out in the claims and shown in the accompanying drawings, in which, Figure 1 is a perspective view of the device. Fig. 2 is a section on the line 2—2 of Fig. 5. Fig. 3 is a perspective view of one form of cutting die. Fig. 4 is a perspective view of a die plate detached. Fig. 5 is a vertical central section through the complete device. Fig. 6 is a perspective view of a form of die employed for cutting out teeth in cross cut saws. Fig. 7 is a perspective view of the die plate coöperating with the die shown in Fig. 6. Fig. 8 is a plan view, a die shank being shown in section and a band saw being shown in dotted lines. Fig. 9 is a transverse section on the line 9—9 of Fig. 8.

In these drawings, 1 represents a suitable base the front of which is recessed as shown at 2, for the purpose of receiving a die plate 3. Mounted upon this base is a suitable block 4, which is undercut in order that it may overhang the die plate and through the overhanging portion or head 5 is formed a vertical bore 6, through which works a shank 7. A cam 8 is pivotally mounted upon the head 5 between suitable ears 9 and is provided with a stem 10 over which a suitable handle 11, such as gas pipe, can be fitted. By pulling said lever forward the cam 8 will depress the shank 7 and in order to lift the shank when the handle is again moved into a vertical position a pin 12 extends rearwardly from the shank 7 and is engaged by a leaf spring, one end of which is secured to the block 4 and the tension of which is regulated by a screw 14, upon which work nuts 15 arranged respectively upon opposite sides of the spring 13. In order to properly gum the cross cut saw i is necessary to employ dies of different sizes and shapes and it is therefore essential that the dies and plates be interchangeable in order to make the punch operable for the purpose intended. Consequently the shank 7 is provided with a suitable socket and the die 16, whatever may be the configuration of its cutting portion is formed in the shape of a right-angle, the horizontal member of which carries a pin 16ª, which extends into the shank socket and is locked therein by a suitable set screw 17. The vertical member of the die forms a guide member and enters a suitable recess 19 formed upon the rea edge of the die plate 3. The cutting member is in the form of a rib or web carried by the under face of the horizontal member of the die and also integral with the outer faces of the vertical member. The shape of these cutting or punching members varies with the shape and size of the cut to be made and for making a gum in the form of a transversely extending slot, I employ the punching member 20, which when not used enters a slot 21 upon the die plate, which slot opens into the recess 19 of said plate.

For producing the larger sizes of gums, I provide a punching member 22 the forward end of which is rounded, and which coöperates with the similar shaped slot 23 formed in another die plate 3 and also communicating with the recess 19.

Both the dies and die plate shown in Figs. 3, 4, 6 and 7 are employed in operating upon cross cut saws. In order to operate upon a band saw suitable dies and die plates will be provided having the proper outline. As it would not be practicable to handle a band saw in exactly the same manner as a cross cut saw, I provide a suitable gage 24 for the back of the band saw, the gage being provided with a groove 25 in which the back of the saw travels. This gage is adjustably held in proper position parallel to the front of the base 1, by means of rods 26 which pass horizontally through suitable lugs 27 formed on the base and upon opposite sides of the block 4.

In order that the teeth may be properly spaced apart I provide a spacing device which consists of a suitable upright 28 upon which is pivotally mounted a bifurcated arm 29, in the bifurcation of which is pivoted a spacing finger 30, the lower end of which is adapted to rest in the gum or cut last produced. It is therefore only necessary to mark them and properly space the first two cuts, and then move the saw along so that the finger 30 will always rest in the last cut made, in order that all of the cuts may be the same distance apart. By slightly rotating the arm 29 upon the upright 28 the finger can be swung closer to or farther away from the die thus decreasing or increasing the distance between the cuts.

It will be obvious from the drawings and the above description and I have provided a very simple and a durable device for punching out new saw teeth, and with the handle the proper length a leverage can be obtained so that this work can be done by hand and without the use of machinery other than I have above described.

What I claim is:

1. A device of the kind described comprising a block having an overhanging head, said block having a curved rear face, a shank working vertically through the head and projecting below and above it, a die carried by the lower end of the shank, a rearwardly extending pin carried by the upper end of the shank, and a flat spring having one end secured to the lower rear face of the block and having its free end in engagement with the underside of said pin and a tension screw passing through said pin into said block, said screw being arranged substantially midway the ends of said spring.

2. A device of the kind described comprising a base, a die plate thereon, a block having an overhanging head portion, a shank vertically movable in the head portion, a die carried by the shank and adapted to coöperate with said plate, means for actuating said shank, and a spacing finger arranged adjacent said block, said finger being adjustable with respect to the said die and die plate, as and for the purpose set forth.

JOSEPH FORT BRADSHAW.

Witnesses:
R. L. HOOKER,
F. R. ROBERTSON.

Copies of this patent may be obtained for five cents each, by addressing the "Commissioner of Patents, Washington, D. C."